Figure 1:
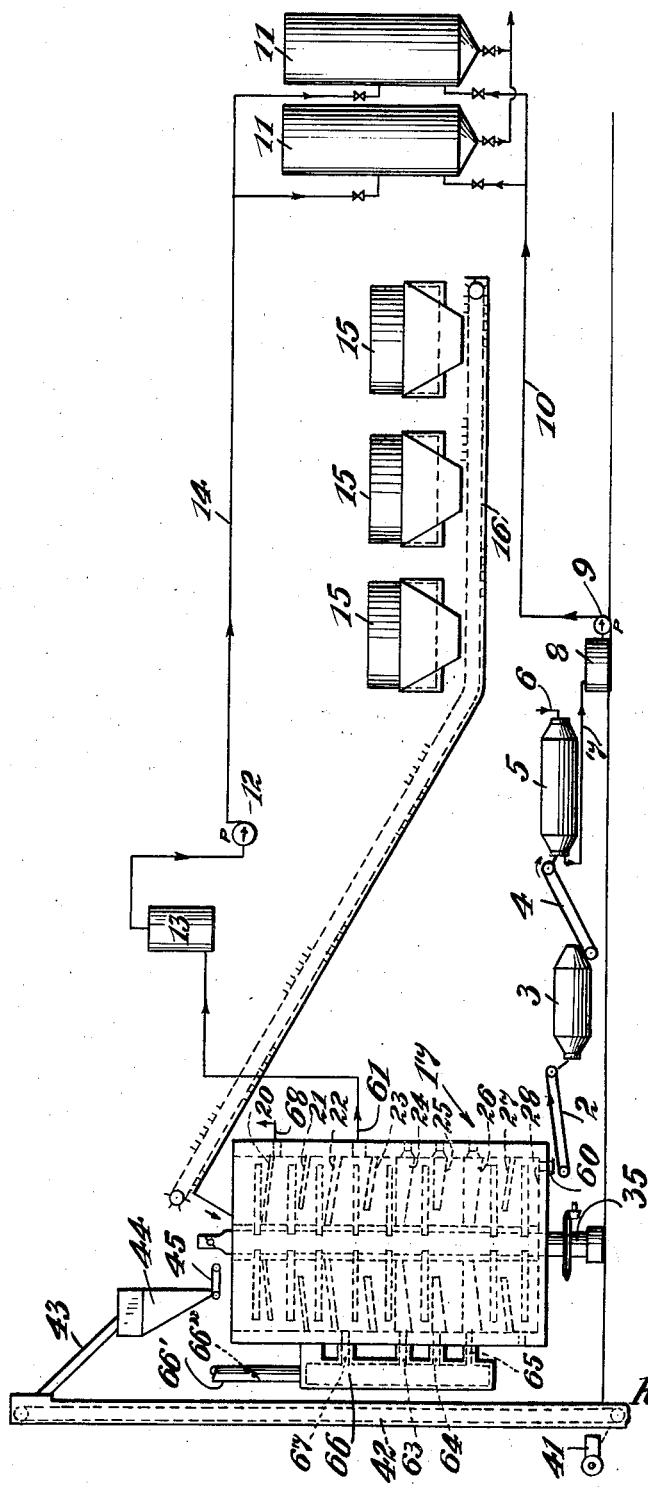

March 19, 1940.  R. M. DANIELS  2,194,164

TREATMENT OF CALCIUM CARBONATE MATERIALS

Filed Nov. 5, 1938  2 Sheets-Sheet 1

INVENTOR
Robert M. Daniels
BY E.C. Sanborn
his ATTORNEY

Patented Mar. 19, 1940

2,194,164

UNITED STATES PATENT OFFICE 2,194,164

TREATMENT OF CALCIUM CARBONATE MATERIALS

Robert M. Daniels, Colorado Springs, Colo., assignor to Holly Sugar Corporation, Colorado Springs, Colo., a corporation of New York Application November 5, 1938, Serial No. 239,029

8 Claims. (Cl. 127—52)

This invention relates to the treatment of calcium carbonate materials and more particularly to such materials in particle sizes smaller than can be treated in the vertical kilns utilized in processes for the obtaining of sugar from sugar beets. An important object of the invention resides in the provision for the treatment of lime cake, produced as an incident to the production of beet sugar, so that the lime cake, heretofore wasted, can be utilized in the sugar production process.

There are two types of beet sugar factories; one called "straight house," the other "Steffens house." For the straight house operation, lime rock is purchased in relatively large lumps because, due to the construction of the kilns employed, the kilns are of the vertical type and are of such a nature that only the larger sized lime rock can be successfully burned therein. The lime rock is mixed with coke and calcined. Burned lime (CaO) is one resulting product, and this is mixed with wash water from the filter presses, called sweet water, to form milk of lime ($Ca(OH)_2$), then mixed with beet juice resulting in the chemical neutralization of acids in the juices plus a coagulation and precipitation of the organic and inorganic material present in the juice in a fine state of subdivision. This mixture of juice and lime then has passed through it carbon dioxide ($CO_2$), resulting from calcining of the lime with the coke which results in a precipitation of calcium carbonate in which precipitation there are occluded various substances previously precipitated or adsorbed from the juice previously described.

The solid material is then filtered away from the juice after this precipitation, and the clear juice results. The lime mud, or cake, with the impurities, which is filtered away is discarded and not re-used.

In the Steffens house operation, lime stone and coke are calcined as heretofore described, but the CaO resulting therefrom is powdered, and added to molasses under certain conditions of temperature and dilution. The resulting product from this mixing of lime and molasses is a chemical known as calcium saccharate, a combination of sugar existing in the molasses, and of lime. This calcium saccharate is then used for the same purpose as calcium hydrate is used in the operation of the straight house, a resulting product, calcium carbonate, in the form of cake or mud, being formed, and subsequently discarded as described above.

Through the present invention the lime cake, instead of being discarded, may be reburned and the carbon dioxide and calcium oxide resulting therefrom may be reintroduced into the process, with consequent extensive economies. Lime cake, being a precipitated calcium carbonate, is an extremely fine powder and cannot be successfully burned in the vertical kilns employed in the beet sugar industry, in which kilns the circulation of air is depended upon for combustion and the drawing off of carbon dioxide.

In the course of my endeavors to accomplish the burning of limecake to recover carbon dioxide and calcium oxide therefrom for reintroduction into the sugar extraction process, I investigated the possibility of utilizing a multiple-hearth, open-fired, gas furnace of the type used in metallurgical operations. While these tests, conducted in such a furnace, showed good results, in the conversion of limecake to calcium oxide, the carbon dioxide gas from the limecake was contaminated with combustion gases from the gas burners and the resultant gaseous mixture showed only from 17 to 20% carbon dioxide, which is insufficient for carbonation treatment of the beet juice.

I subsequently discovered that by calcining the limecake in a multiple hearth furnace embodying both muffle type hearths and direct firing hearths, the combined gases from all the hearths are satisfactory for the carbonation process. While the gas from the muffle type hearths approaches 100% carbon dioxide, calcination being by indirect heat, and is much too concentrated for carbonation of the beet juice, it is diluted by combining with combustion gases from the open-firing type hearths to give the desired concentration.

Tests conducted with limecake in a combination muffle and open type multiple hearth furnace have established that the lime cake was satisfactorily burned to calcium oxide and that the gases from the muffle and open firing type hearths combined to give satisfactory concentrations of carbon dioxide gas.

The present invention thus provides an effective method of calcining limecake to provide not only calcium oxide but also carbon dioxide in concentrations suitable for introduction into the sugar extraction process. Thereby the limecake, produced in vast quantities and previously discarded, is rendered available for use to supply both carbon dioxide and calcium oxide for the extraction process.

The invention is additionally applicable to lime rock "spalls", i. e., particles of limestone in its natural state of such fineness as not to be usable in the customary vertical kilns. Limestone spalls may be calcined in accordance with the present invention, with resultant production of both calcium oxide and carbon dioxide suitable for use in the treatment of the beet juices for the extraction of sugar.

Further features and advantages of the invention will be hereinafter described and claimed.

In the accompanying drawings Fig. 1 is a flow sheet illustrating my novel method of treating limecake in conjunction with the above-described "straight house" extraction operation.

Figure 2:
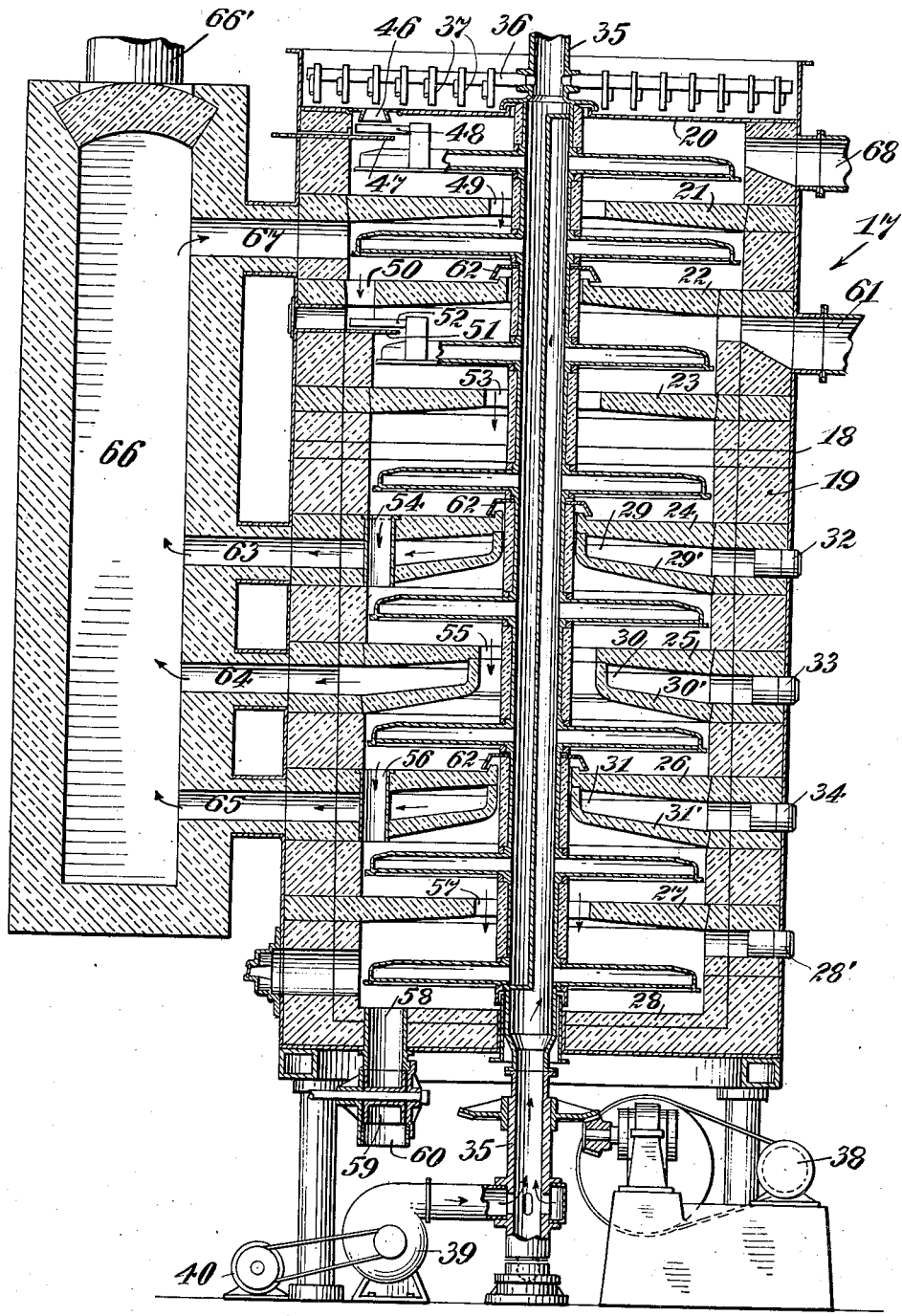

Fig. 2 is a vertical sectional view illustrating a form of furnace suitable for the practice of the invention.

Referring to the drawings, in the customary "straight house" process of beet sugar extraction, lime rock is roasted in the usual vertical kiln (instead of in a multiple hearth furnace such as illustrated) and the burned lime or calcium oxide is delivered by a conveyor 2 to a cooler 3, and thence by a conveyor 4 to a slaker 5, where it is mixed with sweet water (wash water from the filters), delivered to the slaker through a pipe line 6. Milk of lime (calcium hydroxide) flows from the slaker 5 through a pipe line 7 to a tank 8, from which it is forced by a pump 9 through pipe line 10 to carbonators 11. The latter contain juice which has been extracted from the sugar beets in the customary manner. As previously noted, the milk of lime neutralizes the acids in the juice and also causes coagulation and precipitation of finely divided organic and inorganic material present in the juice. Carbon dioxide derived from the calcining of the lime rock is drawn by a pump 12 through a washer 13 and is thence forced by said pump through pipe line 14 into the mixture of juice and lime in the carbonation tanks 11. This results in the precipitation of calcium carbonate in which are occluded the various substances previously precipitated or adsorbed from the juice by the addition of the milk of lime. Subsequently the mixture of juice and precipitated material is delivered to filters 15 whereby the solid matter is separated from the juice. This solid matter is limecake or lime mud, consisting of finely-divided precipitated calcium carbonate, together with the various organic and inorganic substances precipitated or adsorbed from the beet juice as above described. In previous practice this limecake has been removed by a conveyor 16 and delivered thereby to a sewer.

In carrying out my invention I provide, as illustrated at 17, a multiple hearth furnace in lieu of the customary vertical kiln. The furnace 17 may, as shown more particularly in Fig. 2, comprise an outer metallic shell 18 surrounding suitable refractory material 19. At the top is provided a dryer hearth 20. Beneath said hearth 20 are a series of hearths designated 21–28, respectively, of fire brick or other suitable refractory material. Hearth 28 is direct-fired through any suitable number of burners one of which is shown at 28'; the flame passing from said burners directly into the chamber above said hearth. Hearths 25, 26, and 27, on the other hand, are heated indirectly by muffle chambers 29, 30, and 31, respectively, each of said muffle chambers being supplied with burners such as indicated at 32, 33, and 34, respectively. The fuel for the burners may be gas or oil, though coal or other fuel may be used if ample combustion space, as for example, a Dutch oven, is used outside the furnace.

Extending upwardly and axially through the furnace 17 is a shaft 35 which has secured thereto above each hearth a plurality of rabble arms 36, each of which arms carries a series of shoes 37. The shaft is continuously rotated through suitable transmission by a motor 38. A blower 39, driven by a motor 40, may also be provided for forcing air upwardly through the shaft 35, which is hollow, for cooling purposes. The rabble arms may also be hollow, as shown, and in communication with the hollow shaft 35 for receiving cooling air therefrom, as is customary in multiple hearth furnaces. While shoes 37 have been illustrated only in connection with the rabble arms overlying the dryer hearth 20, it will be understood that each of the other rabble arms is likewise provided with such shoes.

In practising my invention with the furnace illustrated, the limecake conveyor 16 (Fig. 1) is extended to deposit the limecake upon the dryer hearth 20. At the same time other calcium carbonate material, such as lime rock spalls, may be passed through a crusher 41 and thence transmitted by an elevator 42 into a chute 43 and spall bin 44, and thence transmitted by measuring feeder 45 to said dryer hearth 20. Either the lime cake alone, or the spalls alone, or various mixtures thereof may thus be deposited on said dryer hearth. As illustrated, said material is deposited on said hearth close to the center shaft 35. Said material is spread out and rabbled across said hearth 20 by the rabble arms and shoes overlying the hearth, the center shaft 35 revolving at speeds depending upon the capacity and the time that the material is required to be in the furnace.

From the hearth 20, the lime material drops through an opening 46 onto a shelf 47, located between hearths 20 and 21, sealing off said hearth 21 from the hearth 20. One of the rabble arms overlying the hearth 21 carries a scraper 48, which, in each revolution of the shaft 35, removes a portion of the material from the shelf 47 on to the hearth 21. The rabble arms and shoes which overlie the hearth 21 move the material around and across said hearth 21, and discharge said material through an opening 49 close to the shaft 35, whence said material drops on to hearth 22. From the latter hearth the material is passed by the associated rabble arms to an opening 50, through which the material drops on to a shelf 51, sealing the hearth 23 from hearth 22. A scraper 52, carried by one of the rabble arms above the hearth 23 removes a portion of the material from shelf 51, in each revolution of the shaft 35, and such material is moved by the rabble arms and shoes over the hearth 23, to an opening 53, through which said material drops on to hearth 24.

Hearths 24, 25, and 26 form the top walls of the respective muffle chambers 29, 30, 31; which chambers have passageways 54, 55 and 56 extending therethrough as shown, to enable the material to be passed to successive hearths. Thus the material on hearth 24 is passed through passage 54, to hearth 25, thence through opening or passage 55, to hearth 26, through passage 56 to hearth 27, and through opening 57 to hearth 28. While only one passage 54 is shown in conjunction with hearth 24, and only one passage 56 in conjunction with hearth 26, it will be apparent that each of said hearths and associated muffle chambers may have a plurality of such passages disposed at different points therearound for the delivery of material to the next lower hearth. From the lowermost hearth 28 the material is delivered to an opening 58, which is sealed by a pocketed wheel 59 driven at a desired speed from any suitable power source. The material thence is delivered by said pocketed wheel through passage 60, from which it may be received by the conveyor 2 shown in Fig. 1.

It will be seen from the foregoing that the material delivered to the dryer hearth 20 is shifted across and around the latter, and across and around each of the successive hearths 21–28, inclusive, by the associated rabble arms and shoes, and is finally delivered to the conveyor 2 through the passage 60. The blades or shoes attached to the respective rabble arms are of course set at such angle as to cause movement of the material in the proper direction, as is well understood.

As previously noted, the hearth 28 is direct fired by burners 28'. The calcium carbonate material, i. e., limecake and/or limerock spalls, on said hearth is thus subjected directly to the heat from said burners; and the carbon dioxide liberated from said calcium carbonate material is mixed with the combustion gases from said burners. These mixed carbon dioxide and combustion gases pass inwardly toward the shaft 35, thence upwardly through the opening 57, outwardly over hearth 27, upwardly through passage 56, inwardly over hearth 26 to opening 55, upwardly through said opening, outwardly over hearth 25 and upwardly through passage 54, inwardly over hearth 24 and upwardly through opening 53, and thence outwardly over hearth 23 to the off-take line 61 which is in communication with washer 13 and pump 12 (Fig. 1). Said pump maintains the carbon-dioxide and combustion gas mixture aforesaid under forced draft and compels its ascent through the path outlined above whence said gases are conveyed by said pump through line 14 to the carbonation tanks 11. Seals 62 of known type prevent the gases from passing from the space above hearth 27 directly up shaft 35 to the space above hearth 26, as well as the passage of said gases directly up said shaft from the space above hearth 25 to the space above hearth 24 and also from the space above hearth 22 down to the space above hearth 23.

The seal formed by the material on the shelf 51 adjacent the opening 50 prevents leakage of the combustion gas mixture from space above hearth 22 to space above hearth 23. At this point it may be noted that hearths 21 and 22 are in essence drying or preheating hearths, and that the waste gases from these hearths contain a high percentage of moisture rendering them of no value for process work. Said hearths 21 and 22, as well as the dryer hearth 20, are heated by the combustion gases from the muffle chambers 29–31, which gases are led through passages 63—65 into a flue 66, and thence through passage 67 into the space above hearth 22, then upwardly through opening 49 to the space above hearth 21, and finally through the off-take passage 68 to a stack whence they pass to atmosphere. The seal formed by the carbonate material on the shelf 51 prevents the combustion gases in the space above hearth 22 from leaking through the opening 50 into the space above hearth 23 and thus prevents dilution of the carbon dioxide gas mixture formed on the hearths below. Seal 62, adjacent hearth 22, prevents combustion gases from leaking from the space above hearth 22 to the space above hearth 23 down the outside of shaft 35. From the flue 66 there extends upwardly a stack 66' (Fig. 1) in which is located a damper 66" which may be shifted to any desired position to regulate the amount of combustion gases passing from said stack 66 to hearth 22.

The seal provided by the material on the shelf 47 adjacent the opening 46 prevents the combustion gases from the muffle furnaces from escaping to the drying hearth 20 and therefore into the building which houses the furnace.

The hearths 21 and 22 are provided for preheating the material received from the drying hearth 20 and for burning organic material carried as impurities in the limecake. Hearth 20 may be of any suitable heat conducting material.

Carbon dioxide gas commences to be generated on hearth 23, and this generation progresses down over all the succeeding hearths, being completed on hearth 28. The combustion gases from the burners 28' heat the material and space above hearth 28 and also supply heat for hearth 27. The muffle chambers 29, 30, and 31 radiate heat downwardly upon the material on the respective hearths 25, 26, and 27 and thereby effect heating of said material. The various hearths 21—28 are composed of fire brick or fire clay, while the lower walls 29', 30' and 31' of the muffle chambers are of "carbofrax," i. e., carborundum crystals and refractory clays. It may be noted that the material passing over the hearths 24, 25, and 26 receives practically no heat from the respective muffle chambers below said hearths, since in bedding the furnace the rabble shoes clear the tops of hearths and a layer of the rabble material accumulates, forming an insulating coating over the hearth floor. The effective heat from each muffle chamber is instead radiated downwardly to the space and material above the next lower hearth area.

The heat required for the reaction on the hearths 23 and 24 is contained in the gases produced on the hearths 25—28 by the direct firing of hearth 28 and the indirect firing of hearths 25, 26 and 27. In practice it has been found that the temperature of the gases from hearth 25 is too high to handle commercially and the provision of hearths 23 and 24 utilizes the waste heat, increasing the thermal efficiency of the furnace and reducing the temperature of the gases to such extent as to allow their handling for introduction into the beet juice treating process.

It will be noted that by heating the limecake or other calcium carbonate material by both muffle and direct-fired hearths I provide effectively for the calcining of said material while at the same time mixing with the disassociated carbon dioxide only such amount of combustion gases as will result in the percentage of carbon dioxide appropriate for use in the carbonation of the beet juice. If the requisite heat were provided by muffle furnaces alone, the resulting gases, approaching 100% carbon dioxide, would be of far too high a carbon dioxide content. On the other hand, provision of the required heat by direct firing alone produces an inadequately low content of carbon dioxide. Through heating by both muffle and direct fired hearths, I attain the required amount of heat and at the same time I obtain the proper percentage of carbon dioxide in the resulting gaseous mixture.

With my process, moreover, the desired concentration of carbon dioxide gas is readily obtained simply by regulating the amount of dilution by the combustion gases from the burners 28', which in turn is controlled with facility by regulating the amount of combustion in said burners. The concentration of carbon dioxide in the gases taken off from hearth 23 can be determined by analysis, and the amount of combustion in the burners 28' regulated to provide the desired concentration. Concentrations of carbon dioxide gas of, for example, from about 34 to 40% are suitable for introduction to the beet juice carbonating tanks and may be readily attained by my process above described. The amount of combustion in the burners 28' may be varied in any suitable and well-known manner, as by varying the amount of fuel and/or air supplied to said burners, as is well understood.

The aforesaid process furthermore renders available for use in beet sugar production processes not only the limecake or limemud previously wasted but also finely divided limestone in the natural state, or limerock spalls of too small sizes to be burned in the customary vertical kilns. For example, limestone in the natural state from dust up to about ⅜ inch mesh may be calcined by my process and the calcium oxide and carbon dioxide derived therefrom used in the sugar production process.

If desired, coke dust may be included with the limecake or spalls in varying amounts to increase the quantity of carbon dioxide gas.

While my process has been illustrated specifically in connection with the so-called "straight house" operation it will be obvious that it is likewise fully applicable to the "Steffens house" procedure. In either operation limecake or limerock spalls may be treated in accordance with my process and the resultant calcium oxide and carbon dioxide utilized in the same way as are the calcium oxide and carbon dioxide produced by the customary burning of lime rock in the usual vertical kilns.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. The process of treating lime cake derived from the production of sugar from sugar beets, comprising calcining said lime cake in an indirect-fire hearth, diluting the carbon dioxide derived therefrom to produce a concentration appropriate for the carbonating of beet juice, and applying said carbon dioxide to the carbonating of said beet juice.

2. The process of treating finely-divided calcium carbonate material, comprising calcining said material by heat in both direct and indirect fired hearths, diluting the carbon dioxide derived from said material with combustion gases from the direct-fired hearth for producing a carbon dioxide concentration appropriate for the carbonation of beet juice, and applying said carbon dioxide to the carbonation of said beet juice.

3. The process of treating finely-divided calcium carbonate material, comprising conveying said material to a furnace comprising both indirect and direct fired hearths, calcining said material in said indirect and direct-fired hearths successively, diluting the carbon dioxide from said material with combustion gases from the direct fired hearth for producing a carbon dioxide concentration appropriate for the carbonation of beet juice, and applying said carbon dioxide to the carbonation of beet juice.

4. The process of treating finely-divided calcium carbonate material, comprising subjecting said material to heat for predrying the same, calcining said material by heat derived from indirect and direct-fired hearths, diluting the carbon dioxide derived from said material by combustion gases from the direct-fired hearth for producing a carbon dioxide concentration appropriate for the carbonation of beet juice, and applying said carbon dioxide to the carbonation of beet juice.

5. The process of treating finely-divided calcium carbonate material comprising lime-rock spalls, said process comprising calcining said material in an indirect-fired hearth, diluting the carbon dioxide derived therefrom by combustion gases from another source to produce a carbon dioxide concentration appropriate for the carbonating of beet juice, and applying said carbon dioxide to the carbonating of said beet juice.

6. The process of treating finely-divided calcium carbonate material, comprising calcining said material in an indirect-fired hearth, diluting the carbon dioxide derived therefrom by combustion gases from a direct-fired furnace to produce a carbon dioxide concentration below about 40% but not lower than 30%, and applying said carbon dioxide to the carbonating of sugar beet juice.

7. The process of treating finely-divided calcium carbonate material, comprising calcining said material in an indirect-fired hearth, diluting the carbon dioxide derived therefrom by combustion gases from a direct-fired furnace to produce a carbon dioxide concentration appropriate for the carbonating of beet juice, and applying said carbon dioxide to the carbonating of said beet juice.

8. The process of treating finely-divided calcium carbonate material, comprising calcining said material by heat in both direct and indirect fired hearths, diluting the carbon dioxide derived from said material with combustion gases from the direct-fired hearth for producing a carbon dioxide concentration appropriate for the carbonation of beet juice, regulating the dilution of said carbon dioxide by varying the amount of combustion in the direct-fired hearth, and applying said carbon dioxide to the carbonation of said beet juice.

ROBERT M. DANIELS.